United States Patent [19]

Thiele

[11] 4,308,599
[45] Dec. 29, 1981

[54] ECHO SOUNDER TRANSMITTING RADIANT ENERGY AT TWO FREQUENCIES

[75] Inventor: Rudolf W. Thiele, Bremen, Fed. Rep. of Germany

[73] Assignee: Fried. Krupp Gesellschaft mit beschränker Haftung, Essen, Fed. Rep. of Germany

[21] Appl. No.: 150,961

[22] Filed: May 19, 1980

[30] Foreign Application Priority Data

May 19, 1979 [DE] Fed. Rep. of Germany ....... 2920330

[51] Int. Cl.$^3$ ............................................. G01S 15/02
[52] U.S. Cl. ..................................... 367/92; 367/101; 367/110; 367/903
[58] Field of Search ................ 367/92, 101, 110, 113, 367/115, 903

[56] References Cited

U.S. PATENT DOCUMENTS

| 3,786,405 | 1/1974 | Chramiec et al. | 367/92 |
| 3,793,618 | 2/1974 | Plangger | 367/112 |
| 4,139,834 | 2/1979 | Matsui et al. | 367/903 X |
| 4,216,537 | 8/1980 | Delignieres | 367/92 |

FOREIGN PATENT DOCUMENTS 954135 12/1956 Fed. Rep. of Germany .
1017054 12/1961 Fed. Rep. of Germany .

OTHER PUBLICATIONS

Brandt, "Beiträge zur Schallortung", vol. 1, p. 51 and FIG. 19, Oct. 1953.

*Primary Examiner*—Richard A. Farley
*Attorney, Agent, or Firm*—Spencer & Kaye

[57] ABSTRACT

An echo sounder including a unit for transmitting, into a medium, acoustic signals at two slightly differing high frequencies and in the form of pulses, resulting in the creation of an acoustic signal in the medium at a low frequency equal to the difference between the two high frequencies, and a receiving unit including a receiving transducer for receiving echoes of acoustic signals at the difference frequency and a display device for recording the echo signals in accordance with their travel times, the display device having a signal input which is connected with the low frequency receiving transducer, is further provided with a second receiving transducer responsive to high signal frequencies for receiving echoes of acoustic signals at at least one of the two transmitting frequencies, and a member connecting the second receiving transducer to the signal input of the display device.

5 Claims, 3 Drawing Figures

ECHO SOUNDER TRANSMITTING RADIANT ENERGY AT TWO FREQUENCIES

BACKGROUND OF THE INVENTION

The present invention relates to an echo sounder of the type composed of a transmitting arrangement including two transmitting transducers for the simultaneous pulse-shaped transmission into a body of water of sonic energy at two high frequencies which differ slightly from one another. The intersection of the radiation of this sonic energy at the two different frequencies generates energy which radiates in the water and which has a low frequency equal to the difference between the frequencies emitted by the two transducers. Such echo sounder further employs a receiving arrangement including a low frequency receiving transducer for receiving the echo signals at the difference frequency and a display device for recording the echo signals according to their propagation times, the display device having a signal input which is connected with the low frequency receiving transducer.

It is known to use echo sounders operating with a plurality of transmitting frequencies for the differentiation of bottom strata in a body of water. A safe distinction between hard and soft bottom strata in a body of water is a necessity for marine vessels, particularly in areas where such vessels travel with very little clearance under the keel, and in muddy or silty waters possibly even in contact with the bottom. Such a situation is commonly encountered by supertankers, for example. In such areas it is necessary to continuously monitor the bottom for hidden objects in a layer of mud which could endanger the vessel.

German Pat. No. 1,017,054, for example, describes an arrangement which by transmitting sonic energy pulses at two transmitting frequencies permits a differentiation of bottom strata. Sonic energy at a high transmitting frequency is reflected at the upper stratum of the bottom and does not penetrate therein, thereby furnishing echo signals which indicate the location, or depth, of this upper stratum.

Sonic energy at lower transmitting frequencies penetrates into the bottom and thus furnishes echo signals from the lower lying deposits at the bottom.

However, difficulties arise with this mode of operation with respect to the display of the received echo signals on a common display device. These difficulties have their origin in the fact that with echo sounders the direction characteristic of the sound energy is very narrow for high transmitting frequencies and very broad for low transmitting frequencies. A broad directional characteristic leads to the known effect of a seeming extension of the bottom echo since the reflected sound energy comes not only from parts disposed vertically underneath the echo sounder but also from adjacent parts of the bottom, the latter signals arriving at the receiving transducer staggered in time with respect to the echo signal from the vertical direction. Such an extended bottom echo may mask echo signals from lower lying strata appearing during the same time duration of the bottom echo.

A further difficulty in the display of received echo signals at different frequencies on a common display device arises in the display of echo signals from sloped areas in which the echo signals at the lower frequency may, under certain circumstances, arrive earlier from the slope than from the bottom, whereas the echo signals at the higher frequency always permit a display which reflects the proper bottom orientation. This leads to overlaps in the display, as they are described, for example, in Volume 1 of "Beiträge zur Schallortung" [Contributions to Echo Sounding] on page 51 and illustrated in FIG. 19 (following page 51). This volume was published as part of the series "Sonderbücherreihe der Funkortung" [Series of Special Books on Radio Ranging] by the Committe on Radio Ranging and contains lectures given by the working group on echo sounding at the Symposium in Bremen on Oct. 19th, 1953. Publisher is State Secretary Professor L. Brandt.

SUMMARY OF THE INVENTION

It is thus an object of the present invention to make possible the accurate position recording of echo signals at high and low frequencies.

In pursuit of this and other objects, the present invention can be practiced using a system such as that disclosed in U.S. Pat. No. 3,786,405 which, by emission into water of sonic energy at two high transmitting frequencies differing from one another by a small amount, permits the generation of sonic energy at a low frequency having a value equal to the difference between the two high frequencies.

The objects of the present invention are achieved by providing the receiving arrangement of such a system with a second, high frequency, receiving transducer for receiving the echo signals at at least one of the two transmitting frequencies, and by connecting the high frequency receiving transducer with the signal input of the display device.

This arrangement makes it possible to obtain echo signals from the various bottom strata during each sounding period. The low and high frequency echo signals arriving at the receiving transducers during each sounding period are recorded on a common track such that their travel times are indicated. The thus resulting echogram shows the correct positions of the bottom strata as depth lines.

With hard and rocky bottoms only a single depth line is produced since only a single reflector surface is present and all incoming echo signals have substantially the same travel time.

A distinction between the high and low frequency echo signals is not necessary; the directional characteristics of the sonic pulses at the difference frequency and of the two high transmitting frequencies practically do not differ at all with respect to their spread angles, so that overlapping and masking during the display of the echo signals is avoided.

According to the present invention, this possibility of recording the echo signals at different frequencies during each sounding period on a single track is particularly easy and reliable with the utilization of the echo signals at the two high transmitting frequencies which are already present and the low difference frequency. By way of contrast, an arrangement including a further echo sounder emitting a high transmitting frequency would have the drawback of forming additional difference frequencies between the two transmitting frequencies of the primary echo sounder and the transmitting frequency of the further echo sounder whose directional characteristics have different beam widths so that their echo signals could falsify the display. With such an arrangement the problem on which the present invention is based could not be solved. An arrangement with two echo sounders could thus not be used without special mutual control of the echo sounders.

The performance of soundings at a high sampling rate, which is always desirable, is possible only with an echo sounder according to the present invention.

According to an advantageous embodiment of the present invention, one of the two transmitting transducers which is already included in the sounder is used as the high frequency receiving transducer as well. For that purpose this transmitting transducer is connected, via a transmitting/receiving control unit with both the transmitting arrangement and the receiving arrangement. Such an arrangement provides a particularly simple and economical echo sounder according to the invention since a special second high frequency receiving transducer is thus not required and the costs for a transmitting/receiving control unit, as disclosed, for example, in German Pat. No. 954,135 are very low.

For enhancing the display of the bottom strata it is of advantage to impart a different predeterminable identification to the signals from the two receiving transducers. Thus, according to a further advantageous embodiment of the present invention, the echo signals of the difference frequency energy are preferably displayed with greater intensity than the high frequency echo signals so as to obtain immediate information about hard bottom strata. From such an echogram it can be learned whether and to what extent this hard stratum reaches the upper muddy layer or penetrated through it, respectively. The resulting display shows whether a hard stratum penetrating the upper layer is rocky promontory or a spatially defined object, such as a drum or a pipeline.

Such differences in intensity can be displayed on the paper recording strip of an echograph in the form of different degrees of blackness.

For a display on a cathode-ray tube, a further feature of the present invention provides an identification of the echo signals by way of pulses of different durations or lengths, since a cathode-ray tube is unable to display significant differences in intensity.

There exists the further possibility of combining the two above-mentioned types of identification or to display the echo signals in different colors on a color picture tube, which is recommended for echo sounder displays which already include a color picture tube.

A particular advantage of the present invention is that it permits every individual sounding to provide current information about the present strata formation at the bottom.

DESCRIPTION OF THE PREFERRED EMBODIMENTS

Figure 1:
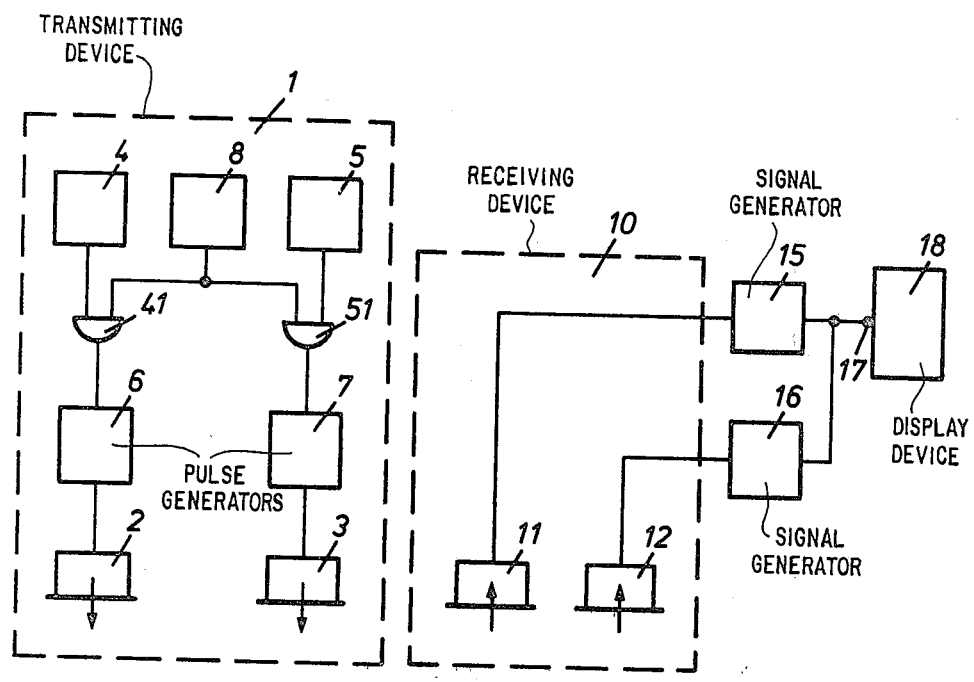
FIG. 1 is a block circuit diagram of one preferred embodiment of an arrangement according to the invention.

FIG. 1 shows an echosounder equipped with a transmitting arrangement 1 which includes two transmitting transducers 2 and 3 for the emission of pulse-shaped sound energy at two adjacent high transmitting frequencies. The transmitting frequencies are generated in two oscillators 4 and 5 which are connected via gates 41,51 to respective transmitting pulse generators 6 and 7 which supply the respective transmitting transducers 2,3. A timing unit 8 opens and closes the gates 41,51 periodically to provide pulse signals. Oscillators for generating two adjacent high transmission frequencies, signal generators for the two frequencies of 194 kHz and 206 kHz for example and a timing unit defining pulse length and synchronisation are well known in the art, see for instance U.S. Pat. No. 3,786,405.

Upon the emission of sonic energy, sonic pulses at the two transmitting frequencies propagate through the water and generate a sonic pulse at a frequency which corresponds to the difference between the two high transmitting frequencies and which also propagate through the water.

The echo sounder further includes a receiving arrangement 10 provided with a low frequency receiving transducer 11 for receiving the difference frequency echo signals. In order to also receive echo signals at least at one of the two transmitting frequencies, the receiving arrangement 10 includes a second, high frequency receiving transducer 12.

The two receiving transducers 11 and 12 are connected, via respective signal generators 15 and 16, to the signal input 17 of a display device 18. The echo signals are displayed on the display device 18. The connected signal generators 15, and 16 impart respectively difference identifications for the display to the echo signals from the two receiving transducers 11, and 12.

Figure 2:
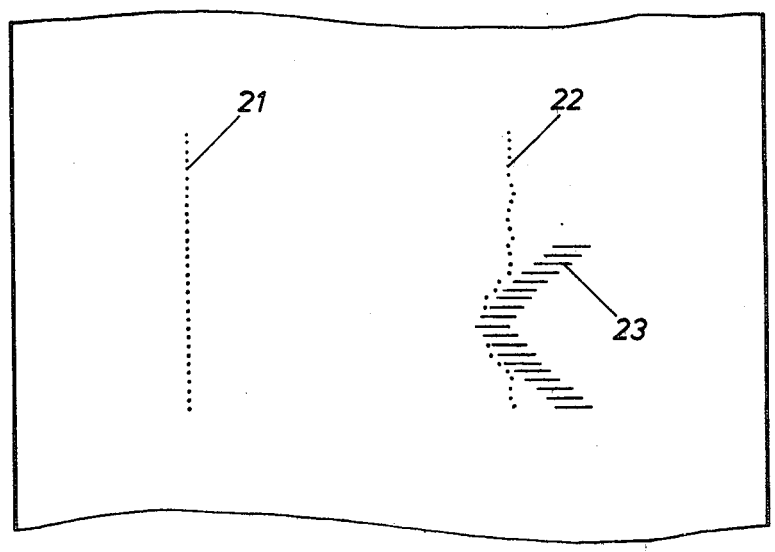
FIG. 2 is an illustration of an echogram obtained with the arrangement of FIG. 1.

A section of an echogram obtained with the arrangement according to the invention is shown in FIG. 2. In a known manner a zero, or reference, line 21 marks the time of the actuation of a transmitting pulse. During each sounding period, incoming echo signals at the low difference frequency and at one or both high transmitting frequencies are recorded, with a distance from line 21 proportional to their travel times, on a common track of the echogram. The recorded signals indicate the depth of the water and the position of bottom strata.

The echo signals at the high transmitting frequency, whose sonic energy does not penetrate into the bottom are reflected at the upper stratum of the bottom and generate a dot-shaped display 22. The echo signals at the difference frequency, whose sonic energy penetrates deeply into the bottom, are reflected at hard strata present in the bottom. They generate pulses of given duration, providing a dash-like display 23.

With these identifications, the echogram produces a distinct display of the immediately underlying configuration of the bottom. The display of the echo signals at the difference frequency in FIG. 2 reveals a defined object which is hidden in the bottom and protrudes slightly through the upper stratum but which is not a rocky peak constituting an extension of lower strata.

Figure 3:
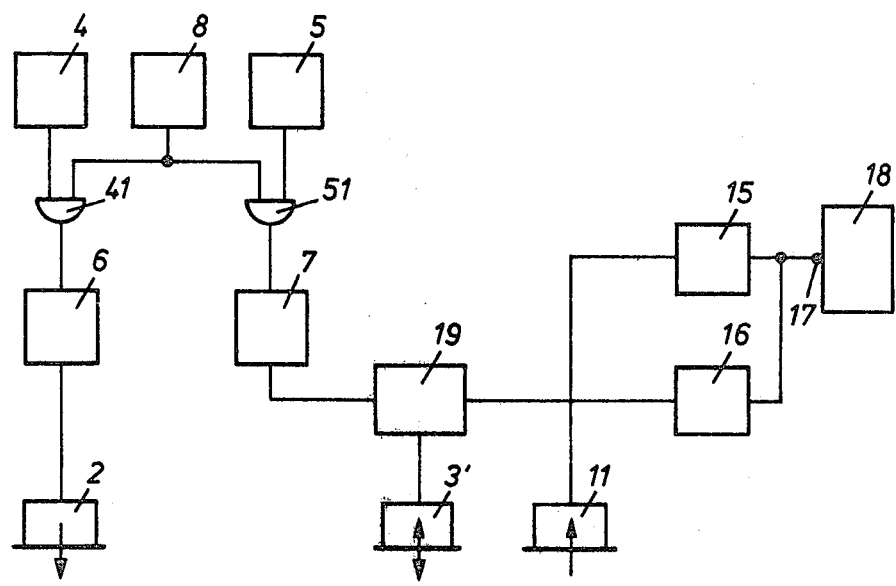
FIG. 3 is a block circuit diagram of a second preferred embodiment of the invention.

According to a further preferred embodiment of the invention, the portion of the circuit of FIG. 1 constituted by transducers 3 and 12 can be modified, as illustrated in FIG. 3, to be composed of a single, bidirectional, electroacoustic transducer 3' connected to pulse generator 7 and signal generator 16 via a transmitting/receiving control unit 19. In accordance with standard practice in the signal transmission art, the control unit 19 is connected to be controlled for delivering pulses constituted by one of the high frequency signals from pulse generator 7 to transducer 3' during each transmission phase, and for then conducting echoes of those signals from transducer 3' to display device 18 via the signal generator 16 during each receiving phase.

Bidirectional transducers for emitting and receiving are well known in the art, see for instance U.S. Pat. No. 3,793,618. A signal generator for identifying echo signals by pulse duration or colour is well known in the art, see for instance U.S. Pat. No. 3,673,559 and U.S. Pat. No. 3,711,822.

It is to be understood that the above description of the present invention is susceptible to various modifications, changes and adaptations, and the same are intended to be comprehended within the meaning and range of equivalents of the appended claims.

What is claimed is:

1. In an echo sounder including means for transmitting, into a medium, acoustic signals at two slightly differing high frequencies and in the form of pulses, resulting in the creation of an acoustic signal in the medium at a low frequency equal to the difference between the two high frequencies, and receiving means including a first receiving transducer for receiving echoes of acoustic signals at the difference frequency, a second receiving transducer responsive to high signal frequencies for receiving echoes of acoustic signals at at least one of the two transmitting frequencies, and display means connected to both receiving transducers for recording the echo signals generated thereby according to their travel times, the improvement wherein said transmitting means are constructed and oriented for transmitting the acoustic signals at the two high frequencies with directional characteristics creating substantially coextensive spread angles so that the spread angle of the low frequency acoustic signal is substantially coextensive with that of each high frequency acoustic signal, and said display means has a single input to which each of said first and second receiving transducers is connected for causing the low frequency echo signals and the echo signals at the at least one high transmitting frequency to be supplied to the same input of said display means.

2. An arrangement as defined in claim 1 further comprising a transmitting/receiving control unit and an electroacoustic transducer forming part of said transmitting means and constituting one of said receiving transducers, said electroacoustic transducer being connected to said control unit, and wherein said control unit is switchable between a first state in which it conducts electrical signals at one of said high frequencies to said electroacoustic transducer for causing the latter to form part of said transmitting means and to transmit one of the acoustic signals at that high frequency, and a second state in which it conducts electrical signals produced by said electroacoustic transducer, in response to impinging acoustic signals at said one of said high frequencies, to said display means.

3. An arrangement as defined in claim 1 wherein said receiving means further comprise two signal generators each connected between a respective one of said receiving transducers and said input of said display means for imparting a respectively different identifying characteristic to the recording of the echo signals provided by each said transducer.

4. An arrangement as defined in claim 3 wherein said generators impart respectively different intensities, as said identifying characteristic, to the recordings of the echo signals provided by said transducers.

5. An arrangement as defined in claim 3 wherein said generators constitute pulse generators each generating a pulse having a respectively different duration in response to each echo signal received by its associated transducer, to thereby impart respectively different lengths, as said identifying characteristic, to the recordings of the echo signals provided by said transducers.

* * * * *